Patented May 23, 1950

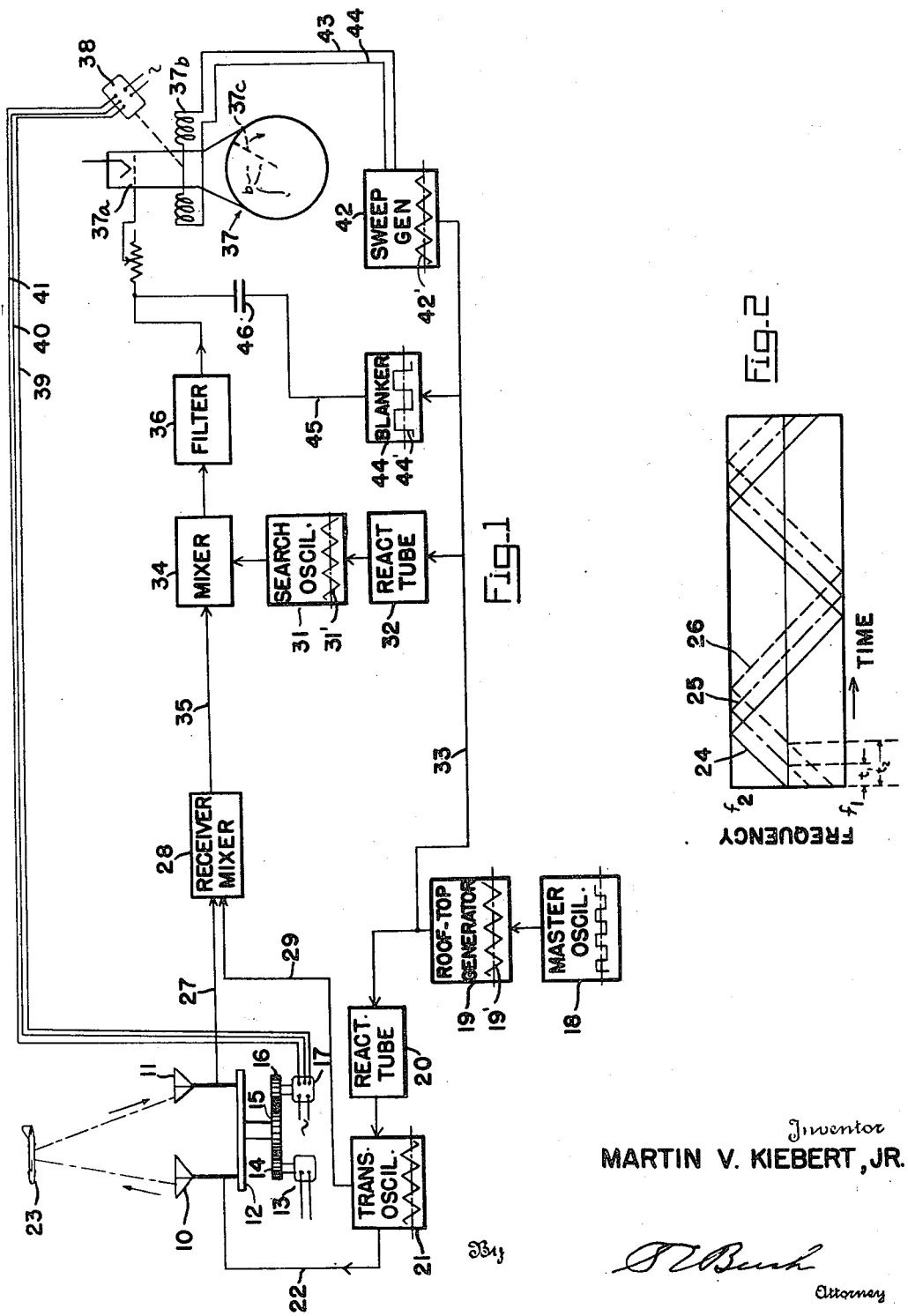

2,508,400

UNITED STATES PATENT OFFICE 2,508,400

FREQUENCY-MODULATED DIRECTION- AND RANGE-FINDING APPARATUS

Martin V. Kiebert, Jr., Arlington, Va.

Application January 24, 1945, Serial No. 574,359

8 Claims. (Cl. 343—14)

(Granted under the act of March 3, 1883, as amended April 30, 1928; 370 O. G. 757)

This invention relates to systems for determining the direction and range of one or more remotely disposed targets by a wave echo technique. Such systems are commonly termed "echo-ranging" or "radar" systems.

Echo-ranging systems prior to this invention have been utilized and these have included as basic components, a rotatable, directional beam antenna, a high frequency wave transmitter, a receiver, and a suitable indicator such as a cathode ray oscilloscope. The transmitter is tuned to a selected carrier frequency, which is modulated by a suitable high-speed electronic keying device to generate a high frequency amplitude modulated pulse output that is fed to the antenna, thus producing a directional beam of high frequency electro-magnetic wave energy, in pulse form, that is propagated at a predetermined rate.

The antenna may comprise a plurality of radiating elements or antenna sections. When the antenna is so directed that the wave energy pulses emitted therefrom impinge upon a remote target, the pulses are reflected from the target and are returned to the point of origin. There the echo pulses are passed to the pulse receiver, are then suitably amplified, and then applied to the brightening grid of the oscilloscope.

In order to produce an indication of both the range and direction of the remotely disposed target from which the echo pulse is received, a sweep circuit is provided for producing a radial sweep or trace of the cathode ray beam on the screen of the oscilloscope. A sawtooth wave generator supplies a sawtooth varying current to a pair of deflection coils which surround the neck of the oscilloscope and produces the radial sweep referred to. By means of a synchronous motion transmission system, such as that marketed under the trade name "Selsyn," the deflection coils are rotated synchronously with rotation of the antenna, and consequently the radial sweep also rotates synchronously with the antenna. Operation of the saw-tooth generator is synchronized with the transmitter in such a manner that a sweep line is initiated substantially simultaneously with each pulse projected, so that accurate indications of the range of the remote target can be obtained. Thus, with the sweep circuit of the oscilloscope in operation synchronously with pulse projection, a pulse echo from the target, when received, will be applied to the brightening grid of the oscilloscope to thereby produce a spot of light on the oscilloscope screen for each target intercepting the transmitted wave pulse. The bearings of the one or more light spots relative to the screen center accordingly represents target bearing of the one or more light spots relative to screen center accordingly represents target range.

While the pulse type echo-ranging system which has been described has given satisfactory operation, it is nevertheless subject to several inherent disadvantages. One of these is the relatively high transmitter voltage required. This voltage, often as high as 40,000 volts, requires a considerable amount of insulation resulting in equipment which is of considerable weight. Another disadvantage is that the amplitude modulated pulse signal is considerably affected by natural interference which clouds reception and may also be "jammed" without too much difficulty by the enemy sending out pulses intended to create interference with the echo-ranging system.

As distinguished from a pulse type, amplitude modulated system, my novel and improved system utilizes a continuously transmitted wave which is frequency modulated. A frequency modulated (FM) system is operated at a voltage much lower than that required in the present amplitude modulated pulse type. The transmitter voltage in the (FM) system, of the order of only 250–1000 volts requires much less insulation resulting in a much lighter equipment which is a material advantage when the system is mounted on aircraft. Furthermore, another advantage inherent in an (FM) system is that it is much less subject to interference from natural phenomena and it is also more difficult for the enemy to "jam" the air with signals intended to create interference.

In this invention, means are provided at a station for continuously radiating a high frequency wave of preferably linearly varying frequency between selected upper and lower frequency range limits. The linear variation may, for example, be symmetrical (in the form of a roof top, as shown in U. S. Patent No. 2,206,903) or it may be asymmetrical (in the form of a saw-tooth, as shown in British Patent No. 546,202). As is already well known, a portion of this radiated wave will be reflected from the one or more targets at different ranges in its path of propagation and returned to the station. At the station, means are then provided for receiving the one or more reflected waves and also for receiving a wave directly from the wave transmitting or radiating means. At any instant each of the reflected waves will differ in frequency from the radiated wave frequency due to the difference in length of path over which the waves travel. This difference in frequency corresponds to the change in frequency of the radiated wave which takes place during the time interval required for the radiated wave to reach the target and return. It is thus evident that the instantaneous difference in frequency between the radiated wave and any reflected wave will be an index of the range between the target and station since the transmission velocity of the wave is considered to be a constant.

Thus if at any instant there are a plurality of targets at different ranges in the path of the radiated wave there will be a corresponding number of reflected waves returning to the station simultaneously, and each of which is different in frequency from the frequency of the transmitted wave. When these are each combined with the radiated wave, there will be produced a corresponding number of beat frequency waves.

Depending upon the range limit being searched, the entire spectrum of beat frequencies which may possibly be present for such a range limit is then scanned or analyzed to determine the presence of any echo waves returning to the station; all echo waves are then portrayed simultaneously on an oscilloscope screen in such manner that the operator can determine the bearing and range of the one or more targets relative to the sending and receiving station.

Referring now to the drawings which illustrate a preferred embodiment of the invention, Fig. 1 is a diagrammatic representation of the system, and Fig. 2 is a plot of frequency versus time, showing the relation in frequency between the transmitted and a plurality of reflected waves.

Referring now to Fig. 1, there is shown at 10 an antenna of conventional construction for projecting an ultra-high, frequency modulated beam wave. A receiving antenna 11 is similar in construction to antenna 10 and both are mounted together on a platform 12 or other suitable support which may be rotated so that the wave energy will be "beamed" in the desired direction into the target field. In searching around the entire horizon, platform 12 is rotated by means of a motor 13, which is coupled through pinion 14 to gear 15, which drives the platform 12 in rotation. Also driven from the gear 15 through pinion 16 is a synchronous motion transmitter unit 17, which may be of the "Selsyn" type. The function of this transmitter will be described in more detail hereinafter.

For generating the frequency modulated wave energy, there is provided a master oscillator unit 18 for producing a square wave. The square wave output from oscillator unit 18 is fed into a modulation generator 19 to produce a symmetrical wave output 19'. Such a wave form is commonly known as a "roof-top" wave. However, as previously explained, the wave form may be asymmetrical in the form of a saw-tooth. The output of the modulation generator 19 is fed into a reactance tube modulator 20 which may be connected with the tank circuit of the transmitter oscillator 21, to thereby produce at its output, a high frequency carrier wave which is continuous, and the frequency of which is modulated linearly in accordance with the linearly varying output of generator 19. This output is then fed into the antenna system 10 over line 22 and projected into space in beam form to search out the one or more targets which may be present in the target field.

Should the projected wave strike a target 23, the wave will be reflected back to the point of origin, where it will be picked up on the receiving antenna 11. The echo, or reflected wave, which returns to the receiving antenna 11, will have the same shape as the transmitted wave, but will be displaced in frequency from the transmitted wave by an amount which is proportional to the time required for the wave energy to travel from the antenna 10 to the target 22 and return therefrom to the receiving antenna 11. This relationship between the transmitted and one or more reflected waves is clearly shown in Fig. 2, where wave 24 represents a transmitted wave, the frequency of which varies from $f_1$ upwardly to $f_2$, then down to $f_1$ and back again to $f_2$. Wave 25 represents the reflected wave from the target 23, which returns to the receiving antenna at a time $t_1$ after wave transmission. Wave 26 represents the echo wave from a more remotely disposed target (not shown), returning at a later time $t_2$. The one or more echo waves 25, 26, etc., are then taken from antenna 11 over line 27 into a receiver-mixer 28. There they are combined with an output directly from the oscillator 21 which feeds in over line 29. Alternatively, the wave energy from oscillator 21 may be picked up by antenna 11 directly from antenna 10 and fed into receiver-mixer 28 in this manner. The design of the receiver-mixer unit 28 is such that the directly fed (FM) wave combines with each of the echo (FM) waves to produce a resultant complex audio output that is made up of the several beat frequency components which may be present and each of which represents a target at a different range in the path of the projected wave.

It has already been explained that for each target reflecting the transmitted wave there will be a reflected wave, and, that at any instant, the frequency difference beween the transmitted wave and a reflected wave will vary with the target range. The greater the range, the greater the frequency difference. The same relation will of course be retained in the beat frequency output spectrum from the receiver-mixer 28.

Now, in order to indicate the presence of the one or more beat frequencies which may exist in the output spectrum of receiver-mixer 28, and also the range of the targets corresponding thereto, I provide a gating unit which operates synchronously with the generator 19. The gating unit sweeps across the output beat frequency spectrum and permits a signal corresponding to each beat frequency which may be present in the spectrum to be put through at the proper time and be indicated to the operator.

In the present embodiment, the gating unit comprises a search oscillator 31 which produces a frequency modulated output wave 31' that varies linearly in the same wave form and with the same period as the output from generator 19 but displaced 180° in phase. The control of oscillator 31 may be by means of reactance tube 32 operating from line 33 in the same manner as reactance tube 20. The output from oscillator 31 combines in mixer 34 with the one or more beat frequency components which may be present in the output of receiver-mixer 28 and which feed into mixer 34 over line 35.

Let it now be assumed that for the particular range limit being searched for one or more targets, the spectrum of all the possible beat frequencies existing in the output of the receiver-mixer 28 has a possible variation between 0 and 10,000 cycles and that there are present two beat frequencies, one at 3,000 cycles and the other at 6,000 cycles. With respect to the 3,000 cycle signal, if we now periodically vary the output frequency of search oscillator 31 linearly from 110,000 to 100,000 cycles, there will be only one instant when the sum output of mixer 34 will be at 110,000 cycles. This will occur when the output frequency of search oscillator is at 107,000 cycles. Likewise with respect to the 6,000 cycle signal, there will be only one instant when the sum output of mixer 34 will be at 110,000 cycles. This will occur when the output frequency of search oscillator is at 104,000 cycles.

If we now connect a filter 36, tuned sharply to 110,000 cycles, to the output of mixer 34, this filter will pass the 3,000 cycle beat frequency signal only when search oscillator 31 is at 107,000 cycles and will pass the 6,000 cycle signal only at a later time when the search oscillator output has reached 104,000 cycles.

It will now be evident that with the described arrangement, signals corresponding to the beat frequency signals existing in the output spectrum of receiver-mixer 28 will be put thru filter 36 sequentially and at a time which is proportional to range since the search oscillator 31 is synchronized with the generator 19.

In other words, the gating unit sweeps across the beat frequency spectrum and, if there is any particular beat frequency present, it will be passed through the gate only at the instant of time which is representative of the range corresponding to such beat frequency.

In order to now portray the presence of the one or more targets, represented by the different beat frequencies, I provide an oscilloscope 37, the brightening grid 37a of which is connected to the output of filter 36. A pair of deflection coils 37b surround the neck of the tube and are rotated around the tube by a "Selsyn" motor 38 which is connected via conductors 39, 40 and 41 to the "Selsyn" generator 17 previously referred to. The arrangement is such that coils 37b are rotated 1 to 1 with the antennas 10 and 11.

The cathode ray beam in the oscilloscope 37 is swept radially from the center of the tube toward the outer edge along a line 37c determined by the position of coils 37b. Thus since the latter are synchronized with the antenna system, the direction of the beam trace relative to the screen center represents the direction in which the antenna system is pointing.

For producing the sweep of the cathode ray beam, there is provided a sweep generator 42 whose output, a roof-top current wave 42', is fed over conductors 43, 44 to the beam deflection coils 37b. Generation of the roof-top current wave by generator 42 is synchronized with operation of the roof-top wave generator 19 over line 33 so that a new sweep of the beam trace in the oscilloscope tube from the tube center is initiated each time that the frequency of the transmitted wave is at $f_1$.

In the system which has been described, use is made of only the descending portion of the roof-top wave output from search oscillator 31, i. e., its linear variation in frequency from the maximum to minimum which, in the example given, would be from 110,000 to 100,000 cycles. Since the output from oscillator 31 is 180° out of phase with the output from generator 19, this means that when the frequency of wave 24 (Fig. 2) is at a minimum or at $f_1$, the output from oscillator 31 is at a maximum or 110,000 cycles. Conversely when the frequency of wave 24 is at a maximum, i. e., at $f_2$, the output from oscillator 31 is at a minimum or 100,000 cycles.

For blanking out the ascending portion of the output from oscillator 31 so that this part of the output can have no effect upon what the operator sees on the screen of oscilloscope 37, a blanker unit 44 is provided. The output from the blanker 44 is a square wave 44' properly synchronized over line 33. The square wave 44' is applied over conductor 45 and through capacitor 46 to the brightening grid 37a of oscilloscope 37. The potential relationship between the output from filter 36 and blanking unit 44 is such that only during the period that the output from oscillator 31 is decreasing in frequency will any signal appearing at the output of filter 36 be effective to so change the bias on grid 37a that the cathode ray beam in the oscilloscope will be visible on the screen.

In operation of the system, the "no signal" bias on the brightening grid 37a is normally maintained at such a value that the beam trace is subdued and cannot be seen on the oscilloscope screen. However, when a signal representing a target is put through filter 36, the grid bias is so changed as to cause the beam to be made visible and a spot of light will appear on the screen. The distance of the spot from the tube center will be proportional to target range due to the functioning of the gating unit, and the angle of the spot relative to the screen center will represent target bearing because of the synchronous relation established between rotation of the beam deflection coils 37b and rotation of the antenna system. Thus if the antenna system is rotated comparatively slowly by motor 13, say at 20 R. P. M., presentation of all targets such as $b$, within the range limit selected, in a 360° target field may be obtained.

While this type of target presentation in the oscilloscope is to be preferred, other types of electron beam sweep and expansion circuits may be used to portray the range and bearing of a plurality of targets intercepting the radiated wave. For example, if the antenna system is fixed in position rather than rotatable, or is selectively positioned manually, one may prefer to utilize an "A" type of presentation. In this latter type, use is made of an oscilloscope having mutually perpendicular pairs of beam deflecting plates or coils. A linear sweep voltage synchronized with the radiated wave would be applied to one set of the plates or coils and the signals corresponding to the echo beat frequencies applied to the other set. Still other types of sweep and expansion circuits may suggest themselves such as a spiral sweep.

As an alternative arrangement, the gating unit described, consisting of reactance tube 32, search oscillator 31, mixer 34 and filter 36 may be replaced with other types of gates having the same function and the appended claims are to be so construed. For example, the output of receiver-mixer 28 may be taken over line 35 into the grid input of a frequency selective amplifier (not shown) such as described in Terman's Radio Engineers' Handbook published 1943 by McGraw-Hill, at page 946. By varying the resistance components in the degenerative network associated with the amplifier synchronously with operation of generator 19, the signal frequency selectively passed through the amplifier may be made to vary linearly from minimum to maximum as a function of time so that any beat frequency appearing at the output of receiver 28 can be put through to the brightening grid 37a at only one time, which time is representative of range of the target producing that particular beat frequency.

In conclusion, while I have described particular embodiments of my invention for purposes of illustration, it will be understood that various modifications and adaptations thereof may be suggested to those skilled in the art without departing from the spirit and scope of the invention as defined in the appended claims.

The invention described herein may be manufactured and used by or for the Government of the United States of America for governmental purposes without the payment of any royalties thereon or therefor.

Having thus fully described my invention, I claim:

1. In an echo-ranging system having a transmitter station for detecting the presence of at least one target at a distance from the station, in combination, a master control oscillator, additional oscillator means operatively connected to and controlled by said master oscillator for producing a control signal varying linearly with time, means for generating high frequency oscillations, means connected to said generating means and said additional oscillator means for utilizing said control signal for frequency modulating said high frequency oscillations, rotatable antenna means including transmitting and receiving reflectors, means for rotating said antenna means, said means for generating high frequency oscillations being operatively connected to said transmitting reflector for energizing the same and transmitting a beam wave of frequency modulated radiant energy, a mixing circuit operatively connected to said means for generating high frequency oscillations and to said receiving reflector for producing at least one signal of a beat frequency substantially proportional to the time of propagation of said wave over twice said distance, a mixer operatively connected to said mixing circuit and energized by the beat frequency signal, a cathode ray tube having an intensifier grid, a search oscillator connected to said mixer and to said additional oscillator means, said search oscillator being constructed and arranged to periodically generate an additional signal covering a predetermined range of frequencies at a period controlled by said additional oscillator means, said mixer supplying an output signal of a frequency which is the algebraic sum of the frequencies of the beat frequency signal and additional signal applied thereto from the mixing circuit and the search oscillator respectively, a filter interconnecting said mixer and said intensifier grid for passing said output signal to said grid only when said output signal has a predetermined frequency, blanker means operatively connected to said intensifier grid and to said additional oscillator means and controlled by the latter, sweep generator means for said cathode ray tube operatively connected to and controlled by said additional oscillator means, and means operatively connected to said rotating means for rotating the sweep of said cathode ray tube in synchronization with said antenna means thereby to provide a sweep having an instant setting corresponding to the instant setting of said rotatable antenna means.

2. In an echo-ranging system for simultaneously detecting the presence of a plurality of targets each at a different range from a station, said system having a scanning radio transmitter located at said station, in combination, master control means, means controlled from said master control means and operatively connected to said transmitter for frequency modulating the output of said transmitter at a linear rate between selected frequency limits periodically at a period controlled by said master control means, receiver means including a receiver mixer and located at said station, said receiver means being constructed and arranged to produce from the target echo and energy received substantially directly from the transmitter a receiver signal having a plurality of frequency components, each of said frequency components consisting of a separate beat frequency for each target within the range being scanned, said beat frequencies being proportional to the instant ranges of the targets respectively, cathode ray tube means having a beam intensity control element therein, blanker means operatively connected to said element and to said master control means and synchronized thereby to periodically blank said tube at a period corresponding to the period of frequency modulation, a search oscillator operatively connected to said master control means to be controlled thereby, said search oscillator being constructed and arranged to produce a search signal which periodically varies in frequency between predetermined limits at a period controlled by said master control means, a mixer operatively connected to said receiver means and to said search oscillator and constructed and arranged to provide an output signal which contains a plurality of frequency components each of which is the algebraic sum of the instant frequency of the search signal and a separate one of the beat frequencies, filter means having said output signal applied thereto and constructed and arranged to pass only a signal of a predetermined frequency, said filter means being operatively connected to said intensity control element, and sweep generator means for said cathode ray tube means operatively connected to said master control means to be controlled thereby, said sweep generator means, mixer, and filter means providing an arrangement whereby the beam of said cathode ray tube means is instantaneously intensified as it reaches positions on the sweep path corresponding to the instant ranges of the targets.

3. In an echo-ranging system for simultaneously detecting the presence of a plurality of targets each at a different range from a station, said system having radio transmitter means including a scanning rotatable transmitting antenna located at said station, a rotatable receiving antenna located at said station, means for rotating said antennae in synchronism, master control means, means controlled from said master control means and operatively connected to said transmitter means for frequency modulating the output of said transmitter means at a linear rate between selected frequency limits periodically at a predetermined period controlled by said master control means, receiver means including a mixer and operatively connected to said receiving antenna, said receiver means being constructed and arranged to produce from the target echo and energy received substantially directly from the transmitter means a receiver signal having a plurality of frequency components, each of said frequency components consisting of a separate beat frequency for each target within the range being scanned, said beat frequencies being proportional to the instant ranges of the targets respectively, cathode ray tube means having a beam intensity control element therein, blanker means operatively connected to said element and to said master control means and synchronized thereby to periodically blank said tube at said predetermined period, a search oscillator operatively connected to said master control means to be controlled thereby, said search oscillator being constructed and arranged to produce a search signal which periodically varies in frequency between predetermined limits at said predetermined period, a mixer operatively connected to said receiver means and to said search oscillator and constructed and arranged to provide an output signal which contains a plurality of frequency components each of which is the algebraic sum of the instant frequency of the search signal and a separate one of the beat frequencies, filter means having said output signal applied thereto and constructed and arranged to pass only a signal of a predetermined frequency, said filter means being operatively connected to said intensity control element, sweep generator means for said cathode ray tube means operatively connected to said master control means to be controlled thereby, said sweep generator means, mixer, and filter means providing an arrangement whereby the beam of said cathode ray tube means is instantaneously intensified as it reaches positions on the sweep path corresponding to the instant ranges of the targets respectively, and means operatively connected to said rotating means for rotating the sweep of said cathode ray tube means in synchronization with said antennae thereby to provide a sweep on said cathode ray tube means having an instant setting corresponding to the instant settings of said rotatable transmitting and receiving antennae.

4. A system according to claim 2 including in addition a connection between the transmitter and the receiver means for conducting energy directly from the transmitter to the receiver means.

5. A system according to claim 3 including in addition a connection between the transmitter means and the receiver means for conducting energy directly from the transmitter means to the receiver means.

6. In an echo-ranging system having a transmitter station for detecting the presence of at least one target at a distance from the station, in combination, a master control oscillator, additional oscillator means operatively connected to and controlled by said master oscillator for producing a control signal varying linearly with time, means for generating high frequency oscillations, means connected to said generating means and said additional oscillator means for utilizing said control signal for frequency modulating said high frequency oscillations, rotatable antenna means including transmitting and receiving reflectors, means for rotating said antenna means, said means for generating high frequency oscillations being operatively connected to said transmitting reflector for energizing the same and transmitting a beam wave of frequency modulated radiant energy, a mixing circuit operatively connected to said means for generating high frequency oscillations and to said receiving reflector for producing at least one signal of a beat frequency substantially proportional to the time of propagation of said wave over twice said distance, a mixer operatively connected to said mixing circuit and energized by the beat frequency signal, a cathode ray tube having an intensifier grid, a search oscillator connected to said mixer and to said additional oscillator means, said search oscillator being constructed and arranged to periodically generate an additional signal covering a predetermined range of frequencies at a period controlled by said additional oscillator means, said mixer supplying an output signal of a frequency which is the algebraic sum of the frequencies of the beat frequency signal and additional signal applied thereto from the mixing circuit and the search oscillator respectively, a filter interconnecting said mixer and said intensifier grid for passing said output signal to said grid only when said output signal has a predetermined frequency, sweep generator means for said cathode ray tube operatively connected to and controlled by said additional oscillator means, and means operatively connected to said rotating means for rotating the sweep of said cathode ray tube in synchronization with said antenna means thereby to provide a sweep having an instant setting corresponding to the instant setting of said rotatable antenna means.

7. In an echo-ranging system for simultaneously detecting the presence of a plurality of targets each at a different range from a station, said system having a scanning radio transmitter located at said station, in combination, master control means, means controlled from said master control means and operatively connected to said transmitter for frequency modulating the output of said transmitter at a linear rate between selected frequency limits periodically at a period controlled by said master control means, receiver means including a receiver mixer and located at said station, said receiver means being constructed and arranged to produce from the target echo and energy received substantially directly from the transmitter a receiver signal having a plurality of frequency components, each of said frequency components consisting of a separate beat frequency for each target within the range being scanned, said beat frequencies being proportional to the instant ranges of the targets respectively, cathode ray tube means having a beam intensity control element therein, a search oscillator operatively connected to said master control means to be controlled thereby, said search oscillator being constructed and arranged to produce a search signal which periodically varies in frequency between predetermined limits at a period controlled by said master control means, a mixer operatively connected to said receiver means and to said search oscillator and constructed and arranged to provide an output signal which contains a plurality of frequency components each of which is the algebraic sum of the instant frequency of the search signal and a separate one of the beat frequencies, filter means having said output signal applied thereto and constructed and arranged to pass only a signal of a predetermined frequency, said filter means being operatively connected to said intensity control element, and sweep generator means for said cathode ray tube means operatively connected to said master control means to be controlled thereby, said sweep generator means, mixer, and filter means providing an arrangement whereby the beam of said cathode ray tube means is instantaneously intensified as it reaches positions on the sweep path corresponding to the instant ranges of the targets.

8. In an echo-ranging system for simultaneously detecting the presence of a plurality of targets each at a different range from a station, said system having radio transmitter means including a scanning rotatable transmitting antenna located at said station, a rotatable receiving antenna located at said station, means for rotating said antennae in synchronism, master control means, means controlled from said master control means and operatively connected to said transmitter means for frequency modulating the output of said transmitter means at a linear rate between selected frequency limits periodically at a predetermined period controlled by said master control means, receiver means including a mixer and operatively connected to said receiving antenna, said receiver means being constructed and arranged to produce from the target echo and energy received substantially directly from the transmitter means a receiver signal having a plurality of frequency components, each of said frequency components consisting of a separate beat frequency for each target within the range being scanned, said beat frequencies being proportional to the instant ranges of the targets respectively, cathode ray tube means having a beam intensity control element therein, a search oscillator operatively connected to said master control means to be controlled thereby, said search oscillator being constructed and arranged to produce a search signal which periodically varies in frequency between predetermined limits at said predetermined period, a mixer operatively connected to said receiver means and to said search oscillator and constructed and arranged to provide an output signal which contains a plurality of frequency components each of which is the algebraic sum of the instant frequency of the search signal and a separate one of the beat frequencies, filter means having said output signal applied thereto and constructed and arranged to pass only a signal of a predetermined frequency, said filter means being operatively connected to said intensity control element, sweep generator means for said cathode ray tube means operatively connected to said master control means to be controlled thereby, said sweep generator means, mixer, and filter means providing an arrangement whereby the beam of said cathode ray tube means is instantaneously intensified as it reaches positions on the sweep path corresponding to the instant ranges of the targets respectively, and means operatively connected to said rotating means for rotating the sweep of said cathode ray tube means in synchronization with said antennae thereby to provide a sweep on said cathode ray tube means having an instant setting corresponding to the instant settings of said rotatable transmitting and receiving antennae.

MARTIN V. KIEBERT, Jr.

REFERENCES CITED

The following references are of record in the file of this patent:

UNITED STATES PATENTS

| Number | Name | Date |
|---|---|---|
| 2,084,760 | Beverage | June 22, 1937 |
| 2,406,953 | Lewis | Sept. 3, 1946 |
| 2,414,096 | Dimond | Jan. 14, 1947 |
| 2,422,134 | Sanders | June 10, 1947 |
| 2,423,023 | Hershberger | June 24, 1947 |

FOREIGN PATENTS

| Number | Country | Date |
|---|---|---|
| 542,634 | Great Britain | Jan. 21, 1942 |

Certificate of Correction

Patent No. 2,508,400　　　　　　　　　　　　　　　　　　　　　　May 23, 1950

MARTIN V. KIEBERT, Jr.

It is hereby certified that errors appear in the printed specification of the above numbered patent requiring correction as follows:

Column 2, line 5, for the word "bearings" read *bearing*; line 7, strike out "of the one or more light spots relative to" and insert instead *and the distance of the spot from the*;

and that the said Letters Patent should be read with these corrections therein that the same may conform to the record of the case in the Patent Office.

Signed and sealed this 26th day of September, A. D. 1950.

[SEAL]

THOMAS F. MURPHY,
　　　　　　　　　　　　　　　　　　　　　　　　*Assistant Commissioner of Patents.*